(12) United States Patent
Matsumoto et al.

(10) Patent No.: US 10,267,245 B2
(45) Date of Patent: Apr. 23, 2019

(54) SUPERCHARGING SYSTEM

(71) Applicant: TOYOTA JIDOSHA KABUSHIKI KAISHA, Toyota-shi (JP)

(72) Inventors: Takuya Matsumoto, Miyoshi (JP); Akihiro Katayama, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 786 days.

(21) Appl. No.: 14/869,055

(22) Filed: Sep. 29, 2015

(65) Prior Publication Data

US 2016/0090926 A1    Mar. 31, 2016

(30) Foreign Application Priority Data

Sep. 30, 2014 (JP) ................................. 2014-201243

(51) Int. Cl.
| | | |
|---|---|---|
| F02D 41/00 | (2006.01) | |
| F02D 41/18 | (2006.01) | |
| F02D 41/22 | (2006.01) | |
| F02M 26/04 | (2016.01) | |
| F02B 37/18 | (2006.01) | |

(52) U.S. Cl.
CPC .......... F02D 41/0007 (2013.01); F02B 37/18 (2013.01); F02D 41/18 (2013.01); F02D 41/221 (2013.01); F02M 26/04 (2016.02); F02D 2041/228 (2013.01); F02D 2200/0406 (2013.01); Y02T 10/144 (2013.01); Y02T 10/40 (2013.01)

(58) Field of Classification Search
CPC .... F02D 41/0007; F02D 41/18; F02D 41/221; F02D 2041/228; F02D 2200/0406; F02B 37/18; F02B 37/183; F02B 37/186; F02M 26/04; G01L 27/007

See application file for complete search history.

(56) References Cited

U.S. PATENT DOCUMENTS

| | | | | |
|---|---|---|---|---|
| 2012/0209496 A1* | 8/2012 | Miyashita | ........... | F02D 41/0007 701/102 |
| 2013/0131953 A1* | 5/2013 | Luft | ......................... | F02B 37/18 701/102 |
| 2015/0253221 A1* | 9/2015 | Nakano | .................. | F02B 37/18 73/112.01 |

FOREIGN PATENT DOCUMENTS

| | | | | |
|---|---|---|---|---|
| JP | 2007-056843 | | 3/2007 | |
| JP | 2008095587 A | * | 4/2008 | .......... Y02T 10/144 |
| JP | 2013-019319 | | 1/2013 | |
| JP | 2014-074386 | | 4/2014 | |

* cited by examiner

*Primary Examiner* — Jason Shanske
*Assistant Examiner* — Jessica Kebea
(74) *Attorney, Agent, or Firm* — Oblon, McClelland, Maier & Neustadt, L.L.P.

(57) ABSTRACT

A supercharging system includes a waste gate valve and an ECU. The ECU is configured to: calculate a first parameter and a second parameter, each of which has a positive correlation with an intake air amount; obtain a first difference by subtracting a first boost pressure from a second boost pressure; obtain a second difference by subtracting the first parameter from the second parameter; obtain a quotient by dividing the first difference by the second difference; and determine that a malfunction occurs in the waste gate valve when the quotient is larger than a threshold value.

11 Claims, 8 Drawing Sheets

SUPERCHARGING SYSTEM

INCORPORATION BY REFERENCE

The disclosure of Japanese Patent Application No. 2014-201243 filed on Sep. 30, 2014 including the specification, drawings and abstract is incorporated herein by reference in its entirety.

BACKGROUND OF THE INVENTION

1. Field of the Invention

The invention relates to a supercharging system.

2. Description of Related Art

As one type of supercharging systems used in internal combustion engines, there is a supercharging system that performs supercharging by utilizing exhaust energy. The supercharging system of this type includes a compressor that is installed in an intake passage of the engine, and is operable to pressurize intake air flowing in the intake passage and deliver it into a combustion chamber of the engine, and a turbine that is installed in an exhaust passage of the engine, and operates, due to the momentum of exhaust gas flowing in the exhaust passage, to drive the compressor. Further, the supercharging system of this type may include a bypass passage through which exhaust gas flows while bypassing the turbine, and a waste gate valve that blocks flow of exhaust gas through the bypass passage when it is in a closed state, and permits the gas flow when it is in an open state. Thus, the bypass passage and the waste gate valve are provided for actively controlling supercharging operation of the supercharging system.

As a supercharging system that conducts malfunction diagnosis for determining the presence or absence of a malfunction of the waste gate valve, a supercharging system as described in Japanese Patent Application Publication No. 2014-074386 (JP 2014-074386 A), for example, is known. In the supercharging system in which supercharging is performed utilizing exhaust energy as described above, the boost pressure changes after the rotational speed of the compressor changes according to change of the momentum of flow of exhaust gas and change of the rotational speed of the turbine; therefore, a lag (turbo lag) arises in change of the boost pressure relative to changes in the fuel injection amount and the throttle opening, for example. Thus, in the supercharging system described in JP 2014-074386 A, various parameters, such as the boost pressure, intake air temperature, and the engine speed, are obtained at the time when a fixed transient period elapses from change of a control signal for switching opening and closing of the waste gate valve, and it is supposed that the turbo lag has been eliminated. Then, the intake air amount calculated based on these parameters is compared with a reference value based on data of the intake air amount obtained when the waste gate valve operates normally. If it is found from the comparison that a deviation of the calculated intake air amount from the reference value is within a given range, it is determined that the waste gate valve is in a normal state. If the deviation exceeds the given range, it is determined that there is a malfunction in the waste gate valve.

SUMMARY OF THE INVENTION

In the meantime, the length of the period it takes to eliminate the turbo lag changes depending on operating conditions. Even if various parameters are obtained at the time when the fixed transient period elapses, as described in JP 2014-074386 A, it may be difficult to remove an influence of the turbo lag. Namely, since the parameters are obtained at a point in time at which the fixed transient period elapses, the parameters may be obtained while the turbo lag has not been eliminated, depending on operating conditions. As a result, malfunction diagnosis may not be appropriately conducted in a diagnostic method in which parameters obtained in a condition where the turbo lag is eliminated are supposed to be used, and the accuracy in malfunction diagnosis may vary depending on operating conditions. Accordingly, it may be difficult to adequately perform malfunction diagnosis, even if the intake air amount, etc. are estimated from various parameters obtained upon the lapse of the fixed transient period, and malfunction diagnosis of the waste gate valve is conducted based on the estimated intake air amount, etc., as in the system of JP 2014-074386 A.

If a transient period long enough to eliminate a turbo lag under any operating conditions is set, variations in the accuracy due to the influence of the turbo lag may be eliminated. However, if such a long transient period is set, malfunction diagnosis cannot be conducted except when the waste gate valve is not switched between the open state and the closed state during the long transient period, and the frequency of execution of the malfunction diagnosis may be reduced. Thus, it is not realistic to set such a long transient period.

This invention is to provide a supercharging system that is less likely or unlikely to suffer from an influence of a turbo lag on the result of diagnosis, and is able to perform malfunction diagnosis with high accuracy.

A supercharging system for an internal combustion engine including an exhaust passage is provided. The supercharging system includes: a supercharger; a bypass passage; a waste gate valve; a first sensor; a second sensor; and an electronic control unit. The supercharger includes a turbine provided in the exhaust passage. The bypass passage is located in the exhaust passage so as to bypass the turbine. The waste gate valve is configured to interrupt flow of exhaust gas into the bypass passage when the waste gate valve is closed. The first sensor is configured to detect an intake air amount of the internal combustion engine. The second sensor is configured to detect a boost pressure. The electronic control unit is configured to: (i) conduct a malfunction diagnosis of the waste gate valve when a precondition is satisfied, the precondition including a condition that a valve opening command is generated, by the electronic control unit, to the waste gate valve; (ii) calculate a parameter having a positive correlation with an integrated intake air amount over a predetermined integration period, when the precondition is satisfied; (iii) detect one of a first boost pressure and a second boost pressure at a point in time during a period from when the predetermined integration period elapses until when the precondition ceases to be satisfied; (iv) detect the first boost pressure when the intake air amount is within a first region, and store the parameter obtained when the first boost pressure is detected as a first parameter; (v) detect the second boost pressure when the intake air amount is within a second region, and store the parameter obtained when the second boost pressure is detected as a second parameter, the second region being spaced apart from the first region; (vi) obtain a first difference by subtracting the first boost pressure from the second boost pressure; (vii) obtain a second difference by subtracting the first parameter from the second parameter; (viii) obtain a quotient by dividing the first difference by the second difference; and (ix) determine that a malfunction occurs in the waste gate valve when the quotient is larger than a determination threshold value.

There is a correlation between the integrated intake air amount and the boost pressure. Namely, as the intake air amount is larger, and the exhaust flow rate is larger, the flow rate of exhaust gas passing the turbine is increased, and energy received by the turbine from the exhaust gas is increased. Since the integrated intake air amount reflects the change history of the intake air amount over the integration period, the magnitude of energy received by the turbine during the integration period can be estimated from the integrated intake air amount. Also, if the parameter having a positive correlation with the integrated intake air amount, rather than the integrated intake air amount, is used, the magnitude of energy received by the turbine during the integration period can be similarly estimated. Accordingly, even if a turbo lag is not eliminated at the time when the integration period elapses, it is possible to estimate the magnitude of the energy received by the turbine during the integration period, referring to the parameter having a positive correlation with the integrated intake air amount.

In the system as described above, the parameter having a positive correlation with the integrated intake air amount, and the boost pressure, are obtained in each of two regions of the intake air amount, which are spaced apart from each other. Here, if the quotient obtained by dividing the difference obtained by subtracting the first boost pressure from the second boost pressure by the difference obtained by subtracting the first parameter from the second parameter is large, it means that the boost pressure largely varies due to a difference in the integrated intake air amount. Namely, if the quotient obtained by dividing the difference obtained by subtracting the first boost pressure from the second boost pressure by the difference obtained by subtracting the first parameter from the second parameter is large, it means that the boost pressure is highly likely to increase as the integrated intake air amount increases. If the same quotient is small, it means that the boost pressure does not become so high even if the integrated intake air amount is large.

When the waste gate valve is in the open state, the boost pressure does not become so high even if the integrated intake air amount is large. On the other hand, when the waste gate valve is in the closed state, the boost pressure is likely to be significantly high as the integrated intake air amount increases. On the basis of this relationship, it is presumed that the waste gate valve is in the closed state even though a valve opening command is generated, when the above-indicated quotient is larger than the determination threshold value even though the respective values stored in the storage unit were obtained under the situation where the precondition including the condition that the valve opening command is generated is satisfied. Therefore, if the above-indicated quotient is compared with the determination threshold value, as in the system as described above, and it is found that the quotient is larger than the determination threshold value, it can be determined that a malfunction occurs in the waste gate valve.

Thus, malfunction diagnosis is not performed using only a parameter obtained at a certain point in time, but is performed using the parameter having a positive relationship with the integrated intake air amount that reflects the change hi story of the intake air amount during the integration period. Therefore, with the above arrangement, even if a turbo lag is not eliminated, the system is less likely or unlikely to suffer from the influence of the turbo lag on the result of diagnosis, and is able to perform the malfunction diagnosis with high accuracy.

In the supercharging system, the electronic control unit may be configured to calculate an average intake air amount in the integration period, as the parameter having the positive correlation with the integrated intake air amount.

When the integrated intake air amount over the integration period is large, the average intake air amount in the integration period becomes large. Namely, the average intake air amount in the integration period is a parameter that changes in direct proportion to the integrated intake air amount. Therefore, the average intake air amount in the integration period can be used as the parameter having a positive correlation with the integrated intake air amount.

In the supercharging system, the precondition may include a condition that an amount of change of the intake air amount per unit time is within a predetermined range. When the amount of change of the intake air amount per unit time is too small, the amount of change of the boost pressure per unit time is reduced. Therefore, a difference is less likely or unlikely to appear between the boost pressure in the case where a malfunction occurs in the waste gate valve, and the boost pressure in the case where there is no malfunction in the valve, and the accuracy in malfunction diagnosis based on the boost pressure may be reduced. Also, when the amount of change of the intake air amount per unit time is too large, a turbo lag becomes extremely large. Therefore, the accuracy in malfunction diagnosis may be reduced even when the parameter having a positive correlation with the integrated intake air amount is used.

On the other hand, if the precondition for execution of malfunction diagnosis includes the condition that the amount of change of the intake air amount per unit time is within the predetermined range, malfunction diagnosis will be conducted except in the case where the amount of change of the intake air amount per unit time is too small, and the case where it is too large. Therefore, the malfunction diagnosis can be performed with high accuracy.

In the supercharging system, the valve opening command may be generated when a target boost pressure is equal to or lower than a predetermined pressure, the precondition may include a condition that the target boost pressure is equal to or lower than the predetermined pressure, as the condition that the valve opening command is generated to the waste gate valve.

If the valve opening command is generated when the target boost pressure is equal to or lower than the predetermined pressure, the condition that the target boost pressure is equal to or lower than the predetermined pressure may be added to the precondition as the condition that the valve opening command is generated.

In the supercharging system, the electronic control unit may be configured to store the boost pressure detected when the integration period elapses, as the first boost pressure or the second boost pressure. As the period from the time when the integration periods ends to the time when the boost pressure used for diagnosis is obtained is longer, the length of time required to obtain the first boost pressure or the second boost pressure is increased, and the time required to perform malfunction diagnosis is increased. Also, the period from the end of the integration period to the time when the boost pressure used for diagnosis is obtained is longer, an influence of the energy received by the turbine until the boost pressure is obtained, on the boost pressure, is increased. Therefore, as the period from the end of the integration period to the time when the boost pressure used for diagnosis is obtained is longer, the parameter having a positive correlation with the integrated intake air amount becomes less correlated with the boost pressure actually obtained. Namely, as the period from the end of the integration period to the time when the boost pressure used for diagnosis is obtained is longer, the accuracy of malfunction diagnosis using the first boost pressure and the second boost pressure is reduced. On the other hand, in the system as described above, malfunction diagnosis is performed based on the boost pressure detected at the point in time at which the integration period elapses. Therefore, the malfunction diagnosis can be promptly performed with high accuracy.

In the supercharging system, the electronic control unit may be configured to output a signal so as to inform that the malfunction occurs in the waste gate valve, when the electronic control unit determines that the malfunction occurs in the waste gate valve.

The supercharging system may further comprise a warning light. The warning light may be configured to inform that the malfunction occurs in the waste gate valve, when the electronic control unit determines that the malfunction occurs in the waste gate valve.

According to a second aspect of the invention, a control method for a vehicle is provided. The vehicle includes an internal combustion engine and a super charging system. The internal combustion engine includes an exhaust passage. The supercharging system includes: a supercharger; a bypass passage; a waste gate valve; a first sensor; a second sensor; and an electronic control unit. The supercharger includes a turbine provided in the exhaust passage. The bypass passage is located in the exhaust passage so as to bypass the turbine. The waste gate valve is configured to interrupt flow of exhaust gas into the bypass passage when the waste gate valve is closed. The first sensor is configured to detect an intake air amount of the internal combustion engine. The second sensor is configured to detect a boost pressure. The control method includes: conducting a malfunction diagnosis of the waste gate valve, by the electronic control unit, when a precondition is satisfied, the precondition including a condition that a valve opening command is generated, by the electronic control unit, to the waste gate valve; calculating a parameter having a positive correlation with an integrated intake air amount over a predetermined integration period, by the electronic control unit, when the precondition is satisfied; detecting, by the electronic control unit, one of a first boost pressure and a second boost pressure at a point in time during a period from when the predetermined integration period elapses until when the precondition ceases to be satisfied; detecting, by the electronic control unit, the first boost pressure when the intake air amount is within a first region, and storing, by the electronic control unit, the parameter obtained when the first boost pressure is detected as a first parameter; detecting, by the electronic control unit, the second boost pressure when the intake air amount is within a second region, and storing, by the electronic control unit, the parameter obtained when the second boost pressure is detected as a second parameter, the second region being spaced apart from the first region; obtaining, by the electronic control unit, a first difference by subtracting the first boost pressure from the second boost pressure; obtaining, by the electronic control unit, a second difference by subtracting the first parameter from the second parameter; obtaining, by the electronic control unit, a quotient by dividing the first difference by the second difference; and determining that a malfunction occurs in the waste gate valve, by the electronic control unit, when the quotient is larger than a determination threshold value.

According to the above arrangement, when it is determined that a malfunction occurs in the waste gate valve, it can be informed that the malfunction occurs in the waste gate valve.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
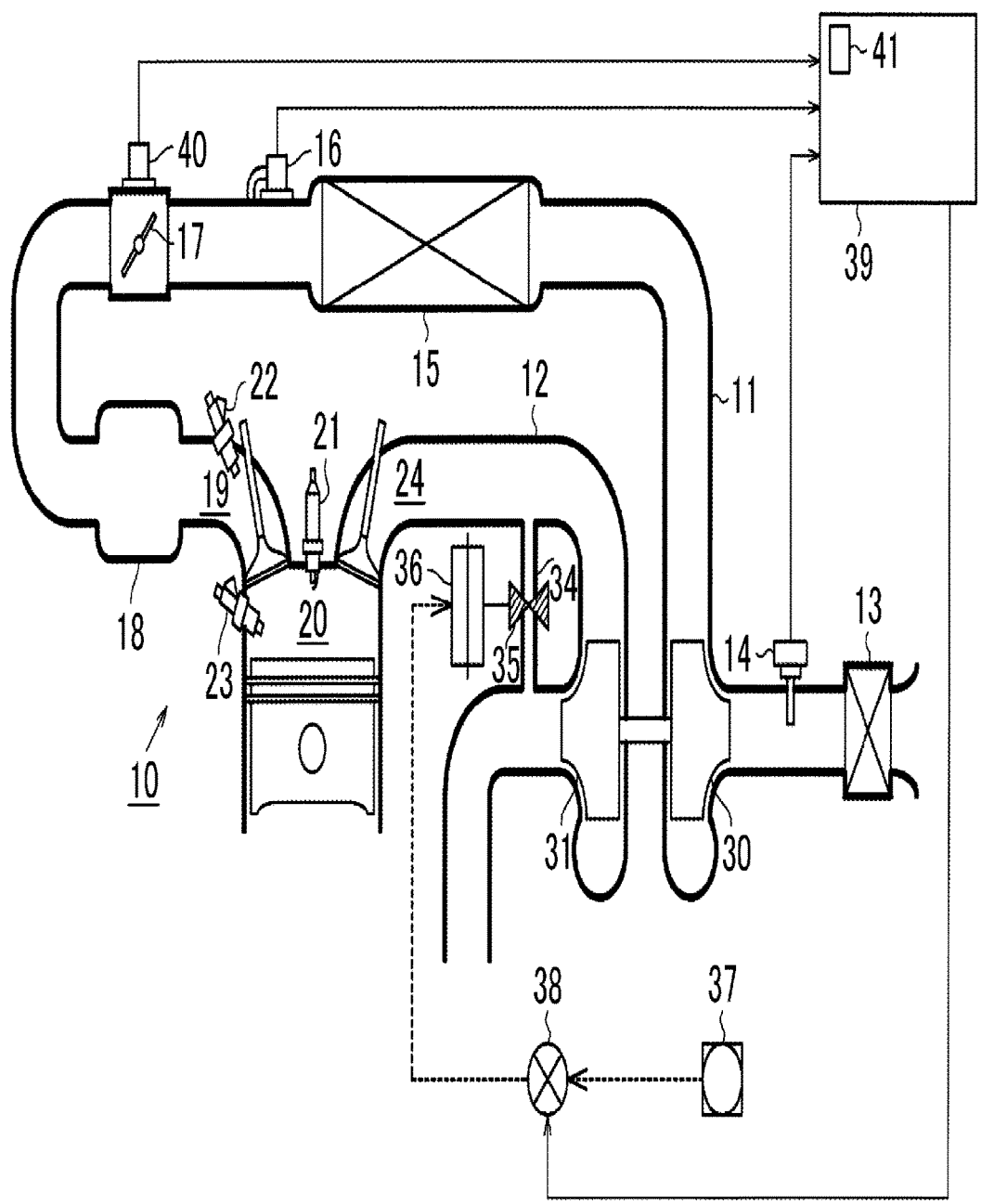
FIG. 1 is a diagram schematically showing the configuration of a supercharging system according to one embodiment of the invention.

Referring to FIG. 1 through FIG. 8, a supercharging system according to one embodiment of the invention will be described in detail. As shown in FIG. 1, the supercharging system of this embodiment has an exhaust gas turbine supercharger including a compressor 30 installed in an intake passage 11 of an internal combustion engine 10, and a turbine 31 installed in an exhaust passage 12 of the engine 10. The compressor 30 and the turbine 31 are mechanically coupled to each other. The compressor 30 is arranged to be driven in accordance with operation of the turbine 31 due to the momentum of flow of exhaust gas, to perform supercharging operation.

An air cleaner 13 that cleans intake air, and an air flow meter 14 are installed in a portion upstream of the compressor 30 in the intake passage 11 of the engine 10. The air flow meter 14, which is one example of the first sensor, serves as an intake air amount detector that detects the flow rate (intake air amount GA) of intake air that passes through the intake passage 11. On the other hand, in a portion of the intake passage 11 downstream of the compressor 30, an intercooler 15 that cools intake air, a boost pressure sensor 16 as a boost pressure detector that detects the boost pressure P, a throttle valve 17 that adjusts the intake air amount GA, and a surge tank 18 for suppressing pulsation of intake air are arranged in the order of description as viewed from the upstream side. The boost pressure sensor is one example of the second sensor.

In the internal combustion engine 10, a port injector 22 is installed in an intake port 19 as a connecting portion of the intake passage 11 with a combustion chamber 20. The port injector 22 injects fuel into intake air flowing in the intake port 19. Also, an in-cylinder injector 23 that injects fuel into the combustion chamber 20, and an ignition plug 21 that produces a spark to ignite an air-fuel mixture introduced into the chamber 20, are installed in the combustion chamber 20. The exhaust passage 12 in which the turbine 31 is installed is connected to the combustion chamber 20 via an exhaust port 24.

The supercharging system also includes a waste gate valve 35. The waste gate valve 35 is installed in a bypass passage 34. The bypass passage 34 is provided for connecting a portion of the exhaust passage 12 upstream of the turbine 31 with a portion of the exhaust passage 12 downstream of the turbine 31. The waste gate valve 35 blocks the bypass passage 34 and interrupts flow of exhaust gas through the bypass passage 34 when it is placed in a closed state, and permits flow of exhaust gas through the bypass passage 34 when it is placed in an open state.

The waste gate valve 35 is connected to a negative-pressure driven type diaphragm 36. In operation, the opening of the waste gate valve 35 is changed according to the magnitude of a negative pressure applied to the diaphragm 36. The diaphragm 36 is connected to a negative-pressure pump 37, via a negative-pressure control valve 38. The negative-pressure pump 37 operates according to rotation of a camshaft (not shown) of the engine 10, so as to produce a negative pressure. In the internal combustion engine 10, a vane-type mechanical pump is employed as the negative-pressure pump 37. The negative-pressure control valve 38 is an electromagnetic valve that adjusts the magnitude of the negative pressure applied to the diaphragm 36, according to energization control for controlling current applied to the valve 38.

The internal combustion engine 10 equipped with the supercharging system as described above is controlled by an electronic control unit 39. The electronic control unit 39 includes a central processing unit (CPU) that performs various computations for engine control, a read-only memory (ROM) in which programs and data for use in control are stored, and a random access memory (RAM) in which computation results of the CPU, detection results of sensors, etc. are temporarily stored.

The electronic control unit 39 receives detection signals of various sensors, such as a throttle sensor 40 that detects the opening (throttle opening TA) of the throttle valve 17, in addition to the above-mentioned air flow meter 14 and boost pressure sensor 16. Also, an atmospheric pressure sensor 41 that detects the atmospheric pressure is incorporated in the electronic control unit 39. In the supercharging system, current applied to the negative-pressure control valve 38 is also controlled by the electronic control unit 39. Namely, the opening of the waste gate valve 35 is controlled based on a valve opening/closing drive command generated by the electronic control unit 39 according to a target boost pressure. In the supercharging system of this embodiment, when the target boost pressure is equal to or lower than a predetermined pressure, a fully opening command for fully opening the waste gate valve 35, for example, is generated as a valve opening command to the waste gate valve 35. The electronic control unit 39 functions as a controller of the internal combustion engine 10, and also functions as a diagnosing unit that determines the presence or absence of a malfunction in the supercharging system.

The electronic control unit 39 determines whether the waste gate valve 35 is stuck in its closed state, as a malfunction diagnosis of the supercharging system. As one type of malfunction that occurs in the supercharging system, the waste gate valve 35 is stuck in the fully closed state, and will hardly be opened.

Figure 2:
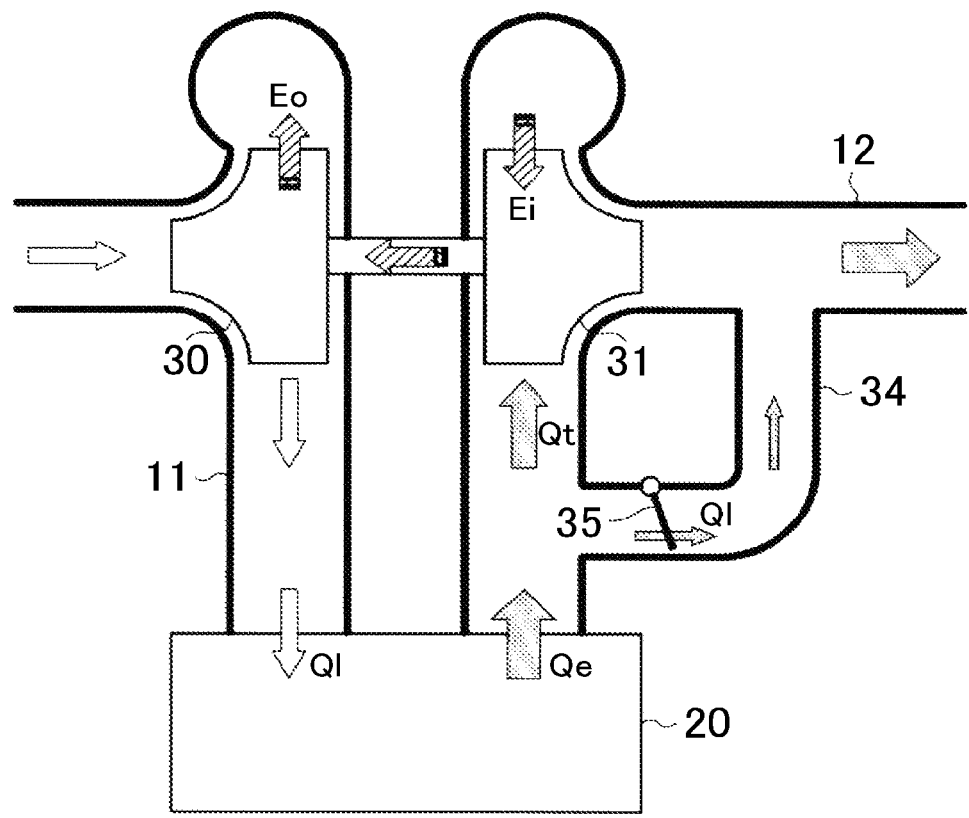
FIG. 2 is a model diagram showing movement of energy in the embodiment of FIG. 1.

In the following, a method of determining whether the waste gate valve 35 is stuck in the closed state according to this embodiment will be described. As shown in FIG. 2, in this supercharging system, the compressor 30 performs supercharging operation, using energy Ei received by the turbine 31 from exhaust gas passing the turbine 31. The energy Ei received by the turbine 31 from exhaust gas has a positive correlation with the flow rate of exhaust gas passing the turbine 31 (which will be called "turbine passing exhaust flow rate Qt"). When the waste gate valve 35 is in the open state, the turbine passing exhaust flow rate Qt is equal to a value obtained by subtracting the flow rate Q1 of exhaust gas passing through the bypass passage 34, from the total exhaust flow rate Qe of gas discharged from the combustion chamber 20 (Qt=Qe−Q1).

In this connection, the total exhaust flow rate Qe has a correlation with the flow rate of intake air flowing into the combustion chamber 20 (which will be called "cylinder inflow air amount Qi"), or the intake air amount GA. Accordingly, it can be said that energy Eo of the supercharging operation of the compressor 30 when the waste gate valve 35 is in the closed state has a correlation with the intake air amount GA.

In the event of a malfunction called "closed-valve-sticking" which means that the waste gate valve 35 is stuck in the closed state, the bypass passage 34 is closed by the waste gate valve 35 that is in the closed state; therefore, exhaust gas does not flow through the bypass passage 34. In this case, since the flow rate Q1 of exhaust gas passing through the bypass passage 34 is not subtracted from the total exhaust flow rate Qe, the turbine passing exhaust flow rate Qt is equal to the total exhaust flow rate Qe (Qt=Qe). Namely, the turbine passing exhaust flow rate Qt at this time is larger than the turbine passing exhaust flow rate Qt of exhaust gas that should have flown based on a command of the electronic control unit 39. Accordingly, the energy Eo of the supercharging operation of the compressor 30 is larger than a value estimated from the type of command generated to the waste gate valve 35 and the intake air amount GA.

More precisely, since the supercharging operation of the compressor 30 involves a loss caused by friction resistance, for example, the energy Eo of the supercharging operation of the compressor 30 is smaller than the energy Ei received by the turbine 31 from exhaust gas. The amount of loss of energy (=Ei−Eo) is a value determined according to the intake air amount GA detected at the time when the compressor 30 starts the supercharging operation. Accordingly, the energy Eo of the supercharging operation of the compressor 30 shows a higher correlation with the amount of increase of the intake air amount GA from the start of the supercharging operation.

Figure 3:
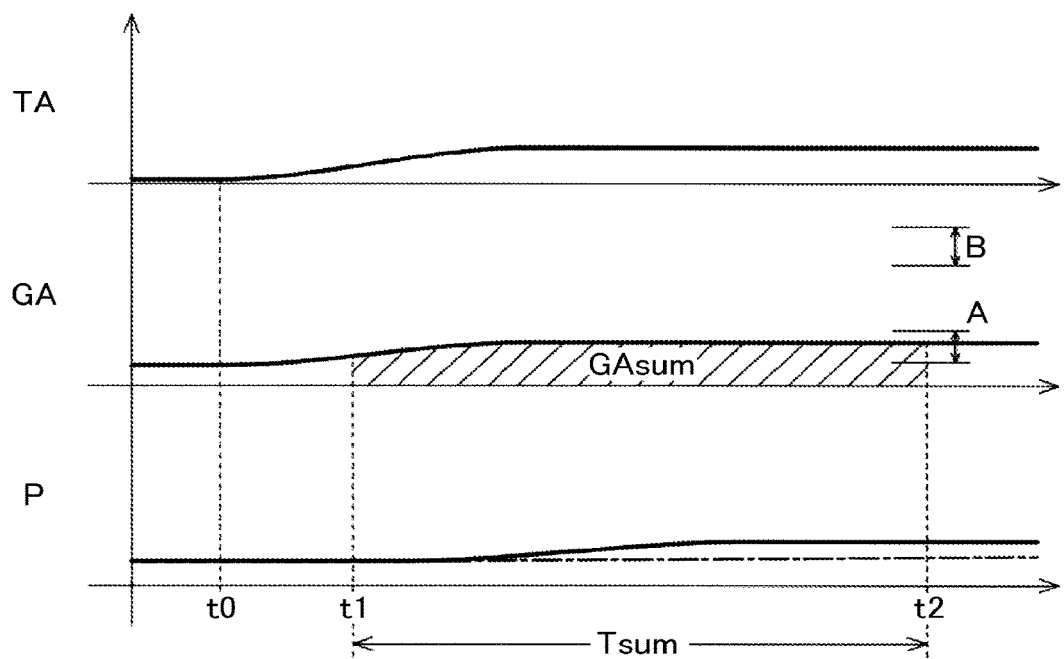
FIG. 3 is a time chart indicating changes in the throttle opening, intake air amount, and the boost pressure with time when the intake air amount is small, in the supercharging system of the embodiment of FIG. 1.
Figure 4:
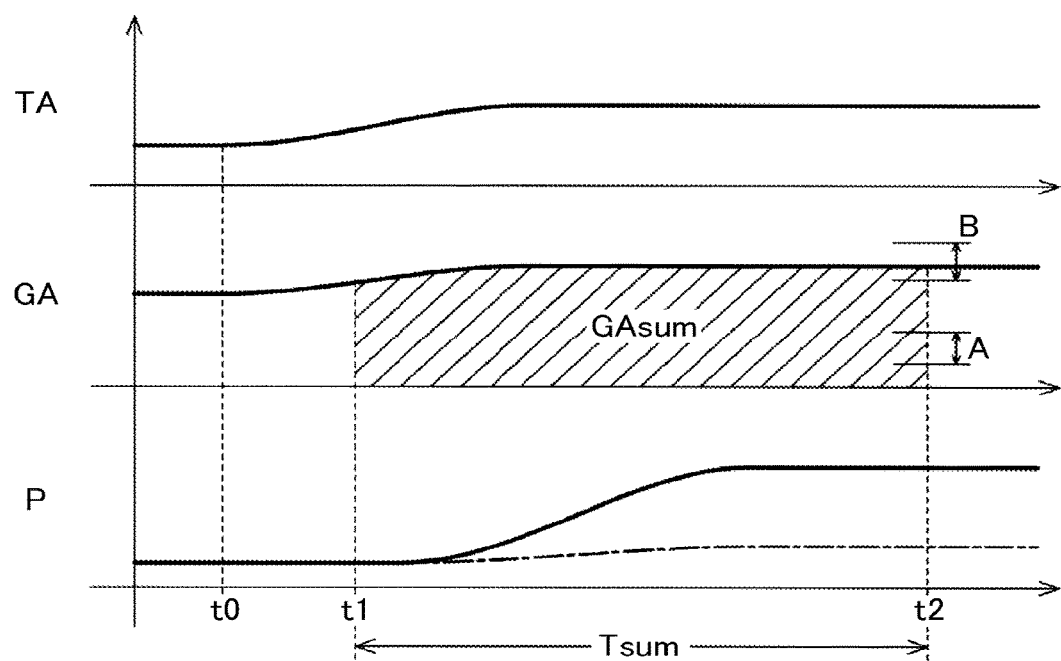
FIG. 4 is a time chart indicating changes in the throttle opening, intake air amount, and the boost pressure with time when the intake air amount is large, in the supercharging system of the embodiment of FIG. 1.

FIG. 3 and FIG. 4 are time charts showing changes in the throttle opening TA, intake air amount Ga, and the boost pressure P with time, when the vehicle is accelerated with a fully opening command being generated to the waste gate valve 35. FIG. 3 shows changes in the respective values with time when the intake air amount GA is small, and FIG. 4 shows changes in the respective values with time when the intake air amount GA is large.

Referring initially to FIG. 3, changes in the respective values with time when the intake air amount GA is small will be described. In FIG. 3, the one-dot chain line indicates changes in the boost pressure P during normal operation where the waste gate valve 35 is in the fully opened state according to a fully opening command, and the solid line indicates changes in the boost pressure P in the event of a closed-valve-sticking malfunction where the waste gate valve 35 is stuck in the closed state irrespective of generation of the fully opening command.

As shown in FIG. 3, after the throttle opening TA is increased at time t0, the intake air amount GA gradually increases. As indicated by the one-dot chain line, the boost pressure P hardly increases during normal operation. This is because the waste gate valve 35 is in the fully opened state, and most of the exhaust gas flows through the bypass passage 34 while bypassing the turbine 31.

On the other hand, in the event of the closed-valve-sticking malfunction, the boost pressure P increases as the intake air amount GA increases, as indicated by the solid line. This is because substantially no exhaust gas flows into the bypass passage 34 with the waste gate valve 35 stuck in the closed state, and the turbine 31 is driven by exhaust gas, so that intake air is pressurized by the compressor 30.

The boost pressure P increases via a process of (A)-(E) as described below. (A) The intake air amount GA increases with increase of the throttle opening TA. (B) The cylinder inflow air amount (the amount of air flowing into the cylinder) increases with increase of the intake air amount GA.

(C) The amount of exhaust gas discharged from the combustion chamber 20 (i.e., the total exhaust flow rate Qe) increases with increase of the cylinder inflow air amount. (D) The turbine passing exhaust flow rate Qt increases with increase of the total exhaust flow rate Qe.

(E) The operation amount of the turbine 31, or the amount of supercharging operation of the compressor 30, increases with increase of the turbine passing exhaust flow rate Qt. The proceeding of the above process involves delay in transportation of intake air and exhaust gas. Therefore, the increase of the boost pressure P is delayed relative to the increase of the intake air amount GA.

The response lag time in supercharging, which will be called "turbo lag", largely varies depending on operating conditions, and it is difficult to predict the turbo lag. Once supercharging is started, the intake air amount GA and the boost pressure P increase for a while, through repeated cycles of increase of the cylinder inflow air amount due to increase of the boost pressure P, increase of the turbine passing exhaust flow rate Qt, increase of the amount of supercharging operation of the compressor 30, and further increase of the boost pressure P. However, these increases in the intake air amount GA and the boost pressure P are saturated after a while, into steady states, and the intake air amount GA and the boost pressure P settle down to constant values.

Subsequently, the correlation between the integrated intake air amount GAsum and the boost pressure P will be described with reference to FIG. 3. The integrated intake air amount GAsum shown in FIG. 3 is a value obtained by integrating the intake air amount GA over the integration period Tsum from time t1 to time t2. In this embodiment, malfunction diagnosis is performed using the average intake air amount GAave that is a quotient obtained by dividing the integrated intake air amount GAsum by the integration period Tsum, as a parameter having a positive correlation with the integrated intake air amount GAsum. The average intake air amount GAave as a parameter that is directly proportional to the integrated intake air amount GAsum is employed for malfunction diagnosis because the turbine passing exhaust flow rate Qt increases, and the energy Ei received by the turbine 31 increases as the intake air amount GA increases, and the total exhaust flow rate Qe increases. Since the integrated intake air amount GAsum is an integrated value of the intake air amount GA that changes according to operating conditions, over the integration period Tsum, the magnitude of the energy Ei received by the turbine 31 during the integration period Tsum is reflected by the integrated intake air amount GAsum that reflects the change history of the intake air amount GA. Accordingly, it is possible to estimate the magnitude of the energy Ei received by the turbine 31 during the integration period Tsum, by referring to the integrated intake air amount GAsum, even if a turbo lag is not eliminated at the time when the integration period Tsum has elapsed. Similarly, it is possible to estimate the magnitude of the energy Ei received by the turbine 31 during the integration period Tsum, using the average intake air amount GAave that is directly proportional to the integrated intake air amount GAsum, rather than the integrated intake air amount GAsum itself.

In this embodiment, the boost pressure Pcmp obtained at time t2 is employed as a boost pressure P for use in malfunction diagnosis of the waste gate valve 35 in this embodiment. In this connection, time t1 is a point in time at which preconditions for execution of malfunction diagnosis are satisfied, and time t2 is a point in time at which the integration period Tsum has elapsed from time t1. The length of the integration period Tsum is set so that it is sufficient to obtain the integrated intake air amount GAsum needed to calculate the average intake air amount GAave having a correlation with the boost pressure P to such an extent that malfunction diagnosis can be conducted, and so that the malfunction diagnosis can be conducted at an appropriate frequency. For example, if the integration period Tsum is too short, the average intake air amount GAave having a sufficient correlation with the boost pressure P cannot be calculated, and the malfunction diagnosis cannot be conducted. If the integration period Tsum is too long, one or more of the preconditions cease to be satisfied before the integration period Tsum elapses, and the malfunction diagnosis cannot be conducted at an appropriate frequency.

As the preconditions under which malfunction diagnosis is carried out, two conditions, namely, a condition that the target boost pressure is equal to or lower than a predetermined pressure, and a condition that the amount of change of the intake air amount GA per unit time is within a certain definite range, are employed.

The target boost pressure is employed as a precondition, because malfunction diagnosis is carried out when a fully opening command is generated to the waste gate valve 35. In this embodiment, the electronic control unit 39 generates the fully opening command to the waste gate valve 35 when the target boost pressure is equal to or lower than the predetermined pressure.

The amount of change of the intake air amount GA per unit time is employed as a precondition, because malfunction diagnosis cannot be performed with high accuracy, depending on the amount of change. More specifically, when the amount of change of the intake air amount GA per unit time is too small, the amount of change of the boost pressure P per unit time becomes small; therefore, a difference is less likely or unlikely to appear between the boost pressure P in the event of a malfunction of the waste gate valve 35, and the boost pressure P in the case of no malfunction. As a result, the accuracy in malfunction diagnosis based on the boost pressure P may be reduced. Also, when the amount of change of the intake air amount GA per unit time is too large, a turbo lag becomes extremely large. In this case, too, the accuracy in malfunction diagnosis may be reduced.

In this embodiment, when both of these two conditions are satisfied, integration of the intake air amount GA is started at time t1, and the integrated intake air amount GAsum is calculated. In the following, the relationship between the integrated intake air amount GAsum and the boost pressure P will be described with reference to FIG. 3 and FIG. 4.

Initially, the relationship between the integrated intake air amount GAsum and the boost pressure P will be described with reference to FIG. 3. During normal operation, namely, when the waste gate valve 35 is in the open state, the boost pressure P hardly changes even if the integrated intake air amount GAsum increases, as indicated by the one-dot chain line in FIG. 3. On the other hand, in the event of a closed-valve-sticking malfunction, namely, when the waste gate valve 35 is stuck in the closed state, the boost pressure P increases as the integrated intake air amount GAsum increases, though the amount of increase of the boost pressure P is very small, as indicated by the solid line in FIG. 3. However, since the amount GA of intake air to be pressurized itself is small when the intake air amount GA is small, a significant difference cannot be observed between change of the boost pressure P in response to increase of the integrated intake air amount GAsum during normal operation and that in the event of the closed-valve-sticking malfunction. Accordingly, when the intake air amount GA is small, the boost pressure Pcmp used for malfunction diagnosis during normal operation is not so different from the boost pressure Pcmp used for malfunction diagnosis in the event of the closed-valve-sticking malfunction.

Subsequently, the relationship between the integrated intake air amount GAsum and the boost pressure Pcmp in the case where the intake air amount GA is large will be described with reference FIG. 4. During normal operation, namely, when the waste gate valve 35 is in the open state, the boost pressure P hardly changes even if the integrated intake air amount GAsum increases, as indicated by the one-dot chain line in FIG. 4. On the other hand, in the event of a closed-valve-sticking malfunction, namely, when the waste gate valve 35 is stuck in the closed state, the boost pressure P increases as the integrated intake air amount GAsum increases, as indicated by the solid line in FIG. 4. Since the amount GA of intake air to be pressurized itself is large when the intake air amount GA is large, a significant difference can be observed between change of the boost pressure P relative to the integrated intake air amount GAsum during normal operation and that in the event of the closed-valve-sticking malfunction, unlike the case where the intake air amount GA is small as shown in FIG. 3. Accordingly, when the intake air amount GA is large, a large difference appears between the boost pressure Pcmp used for malfunction diagnosis during normal operation and the boost pressure Pcmp in the event of the closed-valve-sticking malfunction.

Next, measurement results indicating the relationship between the average intake air amount GAave and the boost pressure Pcmp during normal operation and that in the event of a closed-valve-sticking malfunction will be described, using the graph of FIG. 5. The average intake air amount Gave mentioned herein is a parameter that is directly proportional to the integrated intake air amount GAsum, as described above.

Figure 5:
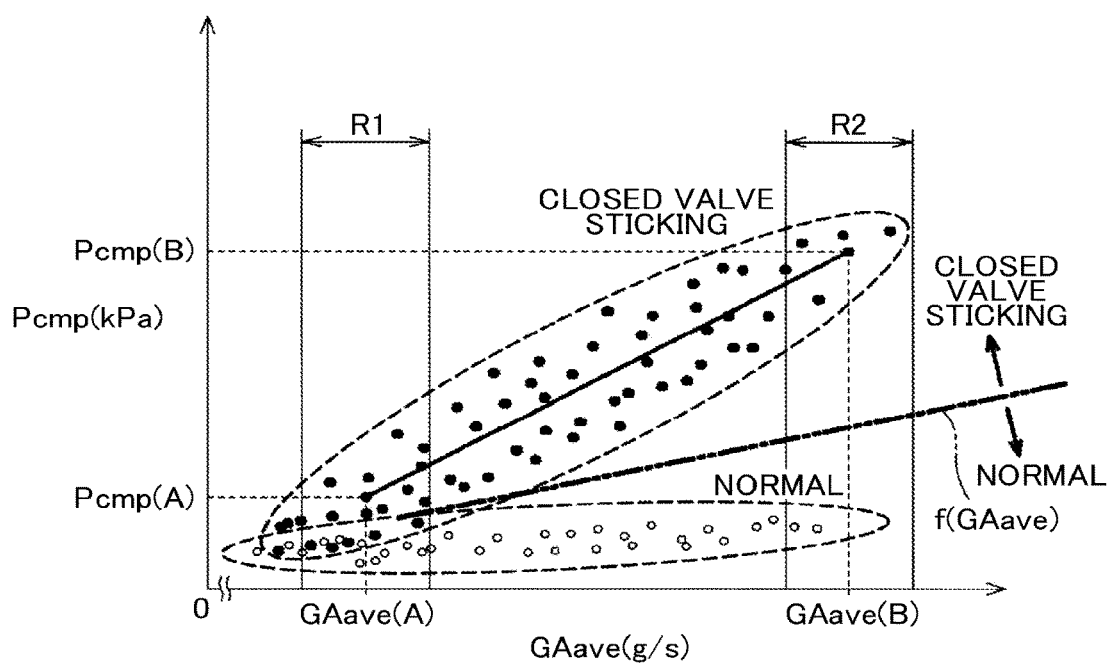
FIG. 5 is a graph in which the relationship between an average intake air amount and a boost pressure, during normal operation and in the event of closed valve sticking, in the supercharging system of the embodiment of FIG. 1, is plotted.

As shown in FIG. 5, when the average intake air amount GAave is in a small region R1, there is no clear difference between the distribution range of measurement results obtained during normal operation and that of measurement results obtained in the event of a closed-valve-sticking malfunction. This is because the average intake air amount GAave is not only correlated with the integrated intake air amount GAsum, but also correlated with the intake air amount GA. More specifically, as explained above with reference to FIG. 3, a significant difference does not appear between change of the boost pressure P according to the integrated intake air amount GAsum during normal operation, and that in the event of the closed-valve-sticking malfunction. When the intake air amount GA detected at the time when the average intake air amount GAave and the boost pressure Pcmp are obtained is within a first region A as shown in FIG. 3, the average intake air amount GAave falls within this region R1.

On the other hand, when the average intake air amount GAave is in a large region R2, there is a clear difference between the distribution range of measurement results obtained during normal operation and that of measurement results obtained in the event of a closed-valve-sticking malfunction. This is because a significant difference appears between change of the boost pressure P according to the integrated intake air amount GAsum during normal operation, and that in the event of the closed-valve-sticking malfunction, as explained above with reference to FIG. 4. When the intake air amount GA detected at the time when the average intake air amount GAave and the boost pressure Pcmp are obtained is within a second region B as shown in FIG. 4, the average intake air amount GAave falls within this region R2. Namely, the first region A and the second region B are sufficiently spaced from each other so that the average intake air amount Gave obtained in the region A falls within the region R1, while the average intake air amount Gave obtained in the region B falls within the region R2.

Figure 6:
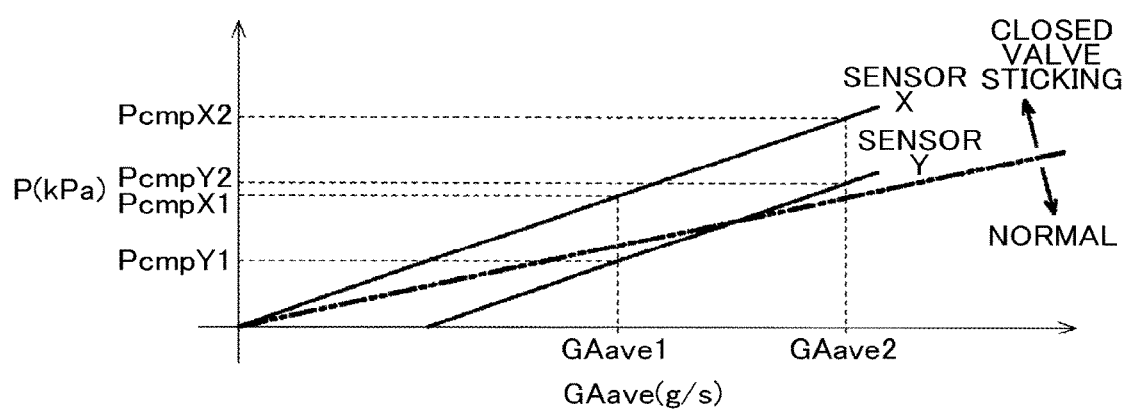
FIG. 6 is a graph showing differences in detection values of the boost pressure due to individual differences of boost pressure sensors.

In FIG. 5, the two-dot chain line indicates a boundary between the distribution range of measurement results obtained during normal operation, and the distribution range of measurement results obtained in the event of a closed-valve-sticking malfunction. In the following, differences in the detection value of the boost pressure P due to individual differences of boost pressure sensors will be described with reference to FIG. 6. FIG. 6 illustrates, by way of example, characteristics of the boost pressure P measured by boost pressure sensors X, Y relative to the average intake air amount GAave. The two-dot chain line in FIG. 6 indicates a boundary between the distribution range of measurement results obtained during normal operation, and that of measurement results obtained in the event of a closed-valve-sticking malfunction, like the two-dot chain line shown in FIG. 5. As is apparent from FIG. 6, detection values of the boost pressure sensor X tend to be larger than detected values of the boost pressure sensor Y.

As a method of malfunction diagnosis for detecting a closed-valve-sticking malfunction of the waste gate valve 35, it is considered to determine whether the waste gate valve 35 is in a normal state or is stuck in the closed state, depending on which of the upper and lower sides of the boundary indicated by the two-dot chain line on which the boost pressure Pcmp corresponding to the average intake air amount GAave lies, utilizing the relationship between the average intake air amount GAave and the boost pressure Pcmp as described above with reference to FIG. 5. However, since there are individual differences in the detection values of the boost pressure sensors X, Y as described above, the result of diagnosis as to whether the waste gate valve 35 is in the normal state or is stuck in the closed state may differ due to the individual differences when this method is employed, even if the malfunction diagnosis is performed by the same method.

More specifically, as shown in FIG. 6, the respective boost pressures PcmpX1, PcmpY1 of the boost pressure sensors X, Y relative to the average intake air amount GAave1 are such that the boost pressure PcmpX1 is in a region of closed-valve-sticking malfunction, whereas the boost pressure PcmpY1 is in a normal region. Also, the respective boost pressures PcmpX2, PcmpY2 of the boost pressure sensors X, Y relative to the average intake air amount GAave2 are such that both of the boost pressures PcmpX2, PcmpY2 are in the region of closed-valve-sticking malfunction. Namely, the result of diagnosis differs due to individual differences of the sensors when the average intake air amount is equal to GAave1, whereas the same result of diagnosis is obtained irrespective of individual differences of the sensors when the average intake air amount is equal to GAave2. It follows that, when the method of determining whether the waste gate valve 35 is in the normal state or is stuck in the closed state, depending on which of the upper and lower sides of the boundary representing determination threshold values as indicated by the two-dot chain line on which the boost pressure Pcmp corresponding to the average intake air amount GAave lies, is employed, the result of diagnosis may vary depending on the sensor used. Accordingly, if malfunction diagnosis is to be performed with high accuracy, using the above-described method, an adaptive operation to adjust the manner of setting determination threshold values according to characteristics of the respective sensors, or the like, will be needed.

On the other hand, in this embodiment, as indicated by the thick solid line in FIG. 5, malfunction diagnosis is performed using value K corresponding to the slope of a line that connects plotted points of the boost pressure Pcmp (Pcmp(A) in FIG. 5) corresponding to the average intake air amount GAave (GAave(A) in FIG. 5) in the region where the average intake air amount GAave is small, and the boost pressure Pcmp (Pcmp(B) in FIG. 5) corresponding to the average intake air amount GAave (GAave(B) in FIG. 5) in the region where the average intake air amount GAave is large. More specifically, it is determined that the waste gate valve 35 is stuck in the closed state when the value K corresponding to the slope of the thick solid line connecting the plotted points in the respective regions is larger than a value corresponding to the slope of the boundary between the distribution ranges as indicated by the two-dot chain line, and that the waste gate valve 35 is in the normal state when the value K is smaller than the same value.

If the waste gate valve 35 is stuck in the closed state, the boost pressure Pcmp should increase as the intake air amount GA increases (with increases in the average intake air amount GAave and the integrated intake air amount GAsum). Accordingly, value K assumes a relatively large value in the event of a closed-valve-sticking malfunction of the waste gate valve 35. In this embodiment, this relationship is utilized, and it is determined that a malfunction occurs in the waste gate valve 35 when the value K is larger than a determination threshold value set to a value corresponding to the slope of the boundary shown in FIG. 5. The value corresponding to the slope of the boundary shown in FIG. 5 is used as the determination threshold value for use in malfunction diagnosis, because the value K in the event of closed-valve-sticking malfunction should be always larger than at least the value corresponding to the slope of the boundary. In this connection, the value K is calculated as a quotient obtained by dividing a value obtained by subtracting Pcmp(A) from Pcmp(B), by a value obtained by subtracting GAave(A) from GAave(B).

As described above, the supercharging system of this embodiment is arranged to perform malfunction diagnosis, using the relationship between the boost pressures Pcmp detected under different conditions through the same sensor, rather than using the boost pressure Pcmp itself. Namely, with the above arrangement, it is possible to perform malfunction diagnosis while reducing or eliminating an influence due to individual differences of the sensors, without requiring adaptive operation for adaptation to sensor characteristics.

Next, a procedure of a diagnostic processing routine executed in the supercharging system of this embodiment will be described with reference to the flowchart of FIG. 7 and FIG. 8. The processing of this routine is repeatedly executed by the electronic control unit 39 during operation of the internal combustion engine 10.

Figure 7:
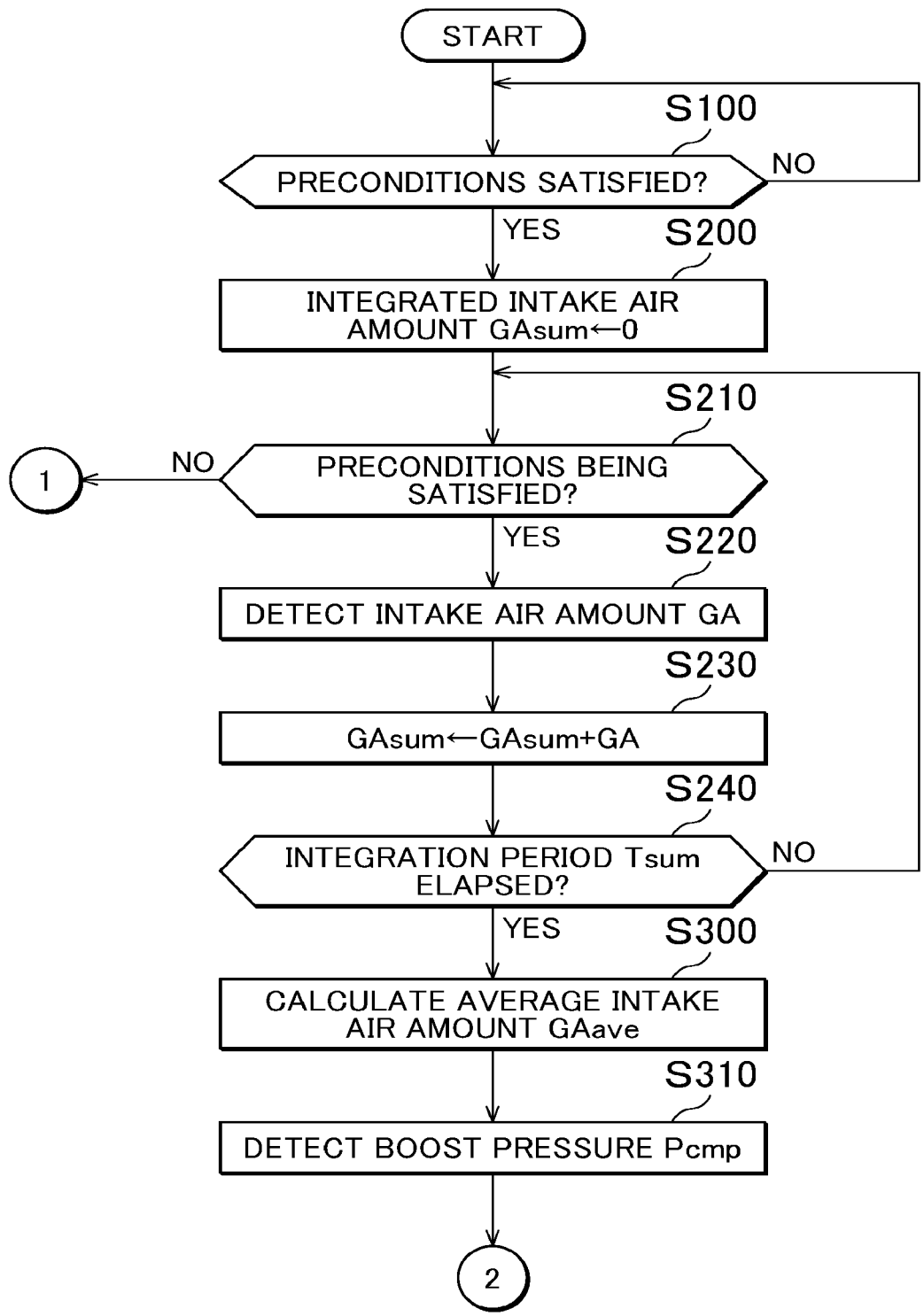
FIG. 7 is a flowchart (step S100, steps S200-S240, steps S300, S310) illustrating a procedure of a diagnostic processing routine executed in the supercharging system of the embodiment of FIG. 1.
Figure 8:
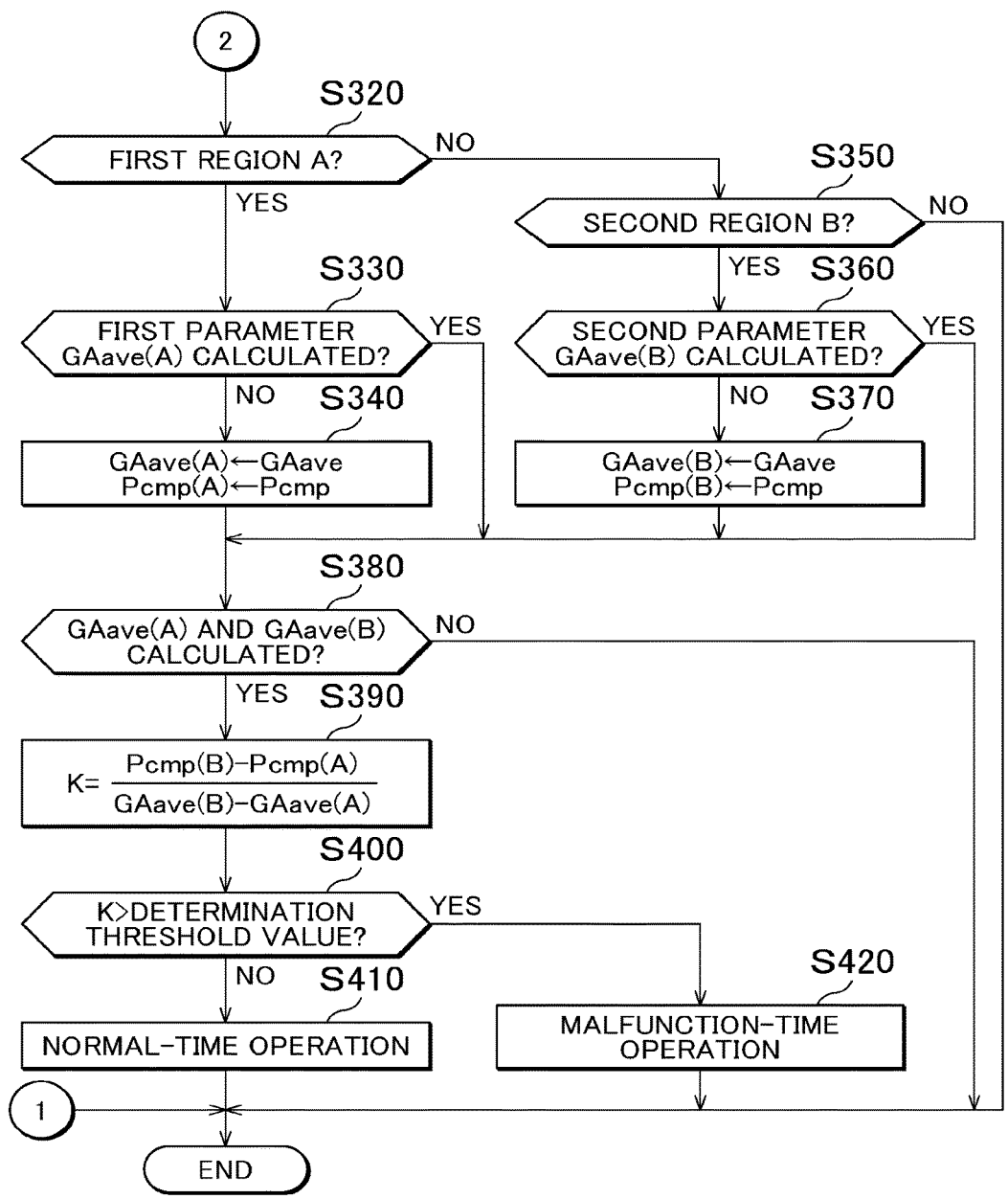
FIG. 8 is a flowchart (steps S320-S420) illustrating a procedure of a diagnostic processing routine executed in the supercharging system of the embodiment of FIG. 1.

Once the processing of this routine is started, it is initially determined in step S100 whether preconditions under which malfunction diagnosis is carried out are satisfied, as shown in FIG. 7. In this embodiment, the preconditions are two conditions that "(a): the target boost pressure is equal to or lower than a predetermined pressure" and "(b): the amount of change of the intake air amount per unit time is within a certain definite range", as described above. Therefore, when both of the conditions (a), (b) as the preconditions are satisfied (S100: YES), the control proceeds to step S200. If any one of the conditions (a), (b) as the preconditions is not satisfied (S100: NO), step S100 is repeated. When the preconditions are satisfied, the integration period Tsum starts being counted.

In step S200, the integrated intake air amount GAsum is reset to "0". Then, the control proceeds to step S210. In step S210, it is determined whether the preconditions that were satisfied in step S100 are still satisfied. If either of the above-indicated conditions (a), (b) as the preconditions is not satisfied (S210: NO), this routine ends, as shown in FIG. 8. If both of the conditions (a), (b) as the preconditions are satisfied (S210: YES), the control proceeds to step S220.

In step S220, the intake air amount GA is detected. Then, the control proceeds to step S230, in which the intake air amount GA detected in step S220 is added to the integrated intake air amount GAsum, so that the latest integrated intake air amount GAsum is calculated. Then, the control proceeds to step S240.

In step S240, it is determined whether the integration period Tsum has elapsed since the preconditions were satisfied in step S100. If the integration period Tsum has elapsed (S240: YES), the control proceeds to step S300. If, on the other hand, the integration period Tsum has not elapsed (S240: NO), the control returns to step S210, and it is determined whether the preconditions are being satisfied. Namely, in this routine, the integrated intake air amount GAsum keeps being calculated unless the integration period Tsum elapses.

Then, in step S300, the average intake air amount GAave is calculated. As described above, the average intake air amount GAave is a quotient obtained by dividing the integrated intake air amount GAsum by the integration period Tsum.

Subsequently, the boost pressure Pcmp is detected in step S310. The boost pressure Pcmp is the boost pressure P detected at a point in time when the integration period Tsum elapses from the time when the preconditions are satisfied. Then, as shown in FIG. 8, it is determined in step S320 whether the intake air amount GA detected at the time when the average intake air amount GAave and the boost pressure Pcmp are obtained through step S300 and step S310 lies in the first region A. The first region A is a region in which the intake air amount GA is small, and a difference between the boost pressure Pcmp during normal operation and the boost pressure Pcmp in the event of a closed-valve-sticking malfunction is not so large, as shown in FIG. 3. Then, as described above, when the intake air amount GA detected at the time when the average intake air amount GAave and the boost pressure Pcmp are obtained is within the first region A, the average intake air amount GAave falls within the region R1, as shown in FIG. 5. If the intake air amount GA detected at the time when the average intake air amount GAave and the boost pressure Pcmp are obtained is within the first region A (S320: YES), the control proceeds to step S330. On the other hand, if the intake air amount GA detected when the average intake air amount GAave and the boost pressure Pcmp are obtained is not within the first region A (S320: NO), the control proceeds to step S350.

In step S330, it is determined whether a first parameter GAave(A) as a parameter having a positive correlation with the integrated intake air amount GAsum in the first region A has been calculated. If the first parameter GAave(A) has not been calculated (S330: NO), the control proceeds to step S340 in which the average intake air amount GAave and the boost pressure Pcmp obtained through step S300 and step S310 are stored as the first parameter GAave(A) and the first boost pressure Pcmp(A). Then, the control proceeds to step S380. On the other hand, if the first parameter GAave(A) has been calculated, the control skips step S340, and proceeds to step S380.

If, on the other hand, the intake air amount GA detected when the average intake air amount GAave and the boost pressure Pcmp are obtained is not within the first region A (S320: NO), it is determined in step S350 whether the intake air amount GA detected when the average intake air amount GAave and the boost pressure Pcmp are obtained lies within the second region B. The second region B is a region in which the intake air amount GA is large, and a significant difference appears between the boost pressure Pcmp during normal operation and the boost pressure Pcmp in the event of a closed-valve-sticking malfunction, as shown in FIG. 4. Then, as described above, when the intake air amount GA detected when the average intake air amount GAave and the boost pressure Pcmp are obtained is within the second region B, the average intake air amount GAave falls within the region R2, as shown in FIG. 5. If the intake air amount GA detected when the average intake air amount GAave and the boost pressure Pcmp are obtained is within the second region B (S350: YES), the control proceeds to step S360. If, on the other hand, the intake air amount GA detected when the average intake air amount GAave and the boost pressure Pcmp are obtained is not within the second region B (S350: NO), this routine ends.

In step S360, it is determined whether a second parameter GAave(B) as a parameter having a positive correlation with the integrated intake air amount GAsum in the second region B has been calculated. If the second parameter GAave(B) has not been calculated (S350: NO), the control proceeds to step S370 in which the average intake air amount GAave and the boost pressure Pcmp obtained through step S300 and step S310 are stored as the second parameter GAave(B) and the second boost pressure Pcmp(B), respectively. Then, the control proceeds to step S380. On the other hand, if the second parameter GAave(B) has been calculated, the control skips step S340, and proceeds to step S380.

Then, it is determined in step S380 whether both of the first parameter GAave(A) and the second parameter GAave (B) have been calculated. If both of these parameters have been calculated (S380: YES), the control proceeds to step S390. If either one of these parameters has not been calculated (S380: NO), this control ends.

In step S390, value K corresponding to the slope of the thick solid line in FIG. 5 is calculated, using the calculated first parameter GAave(A), first boost pressure Pcmp(A), second parameter GAave(B), and the second boost pressure Pcmp(B). The value K is calculated according to the following equation.

$$K=(Pcmp(B)-Pcmp(A))/(GAave(B)-GAave(A))$$

Namely, this value K is a quotient obtained by dividing a difference obtained by subtracting the first boost pressure Pcmp(A) from the second boost pressure Pcmp(B), by a difference obtained by subtracting the first parameter GAave (A) from the second parameter GAave(B).

This routine is repeatedly executed until both of the first parameter GAave(A) and the second parameter GAave(B) have been calculated (S380: YES). Then, after the value K is calculated (S390), malfunction diagnosis of the waste gate valve 35 is conducted in step S400.

In step S400, it is determined whether the value K is larger than the determination threshold value. If the value K is equal to or smaller than the determination threshold value (S400: NO), the control proceeds to step S410. If the value K is larger than the determination threshold value (S400: YES), the control proceeds to step S420.

When the control proceeds to step S410, normal-time operation is performed. In the normal-time operation, when a warning light that informs a malfunction of the waste gate valve 35 is on, for example, an operation to turn off the warning light is performed.

If the control proceeds to step S420, on the other hand, malfunction-time operation is performed. In the malfunction-time operation, a warning light that informs a malfunction of the waste gate valve 35 is turned on, for example, as a result of the determination that a malfunction occurs in the waste gate valve 35. The operation to turn on the warning light in the malfunction-time operation corresponds to informing operation in this embodiment.

Next, details of operation according to the above-described series of steps will be described. In step S100, it is determined whether the preconditions are satisfied, so that it is determined whether operating conditions of the supercharging system are suitable or appropriate for malfunction diagnosis of the waste gate valve 35. In this step, when the fully opening command is generated to the waste gate valve 35, and the amount of change of the intake air amount GA per unit time satisfies a condition that permits malfunction diagnosis to be performed with high accuracy, the preconditions are satisfied in this embodiment (S100: YES).

Then, if one or both of the preconditions is/are not satisfied (S100: NO), step S100 is repeatedly executed. With this arrangement, malfunction diagnosis is carried out when the conditions for performing malfunction diagnosis with high accuracy are satisfied, and no malfunction diagnosis is carried out when the conditions for performing malfunction diagnosis with high accuracy are not satisfied. Thus, the malfunction diagnosis can be performed with high accuracy.

When the preconditions are satisfied (S100: YES), the integrated intake air amount GAsum is reset to "0" in step S200. Then, in step S210, it is determined whether the preconditions are being satisfied, and the control proceeds to step S220 if they are being satisfied (S210: YES), while this routine ends if they are not being satisfied (S210: NO). Namely, if the operating conditions turn into those under which malfunction diagnosis cannot be performed with high accuracy, after calculation of the integrated intake air amount GAsum is started, this routine is finished. With this arrangement, malfunction diagnosis can be performed with higher accuracy.

If the preconditions are being satisfied (S210: YES), the integrated intake air amount GAsum is calculated by integrating the intake air amount GA until the integration period Tsum elapses, through steps S220, S230, S240. At a point in time at which the integration period Tsum elapses (S240: YES), the average intake air amount GAave is calculated in step S300, and then, the boost pressure Pcmp is detected in step S310. Namely, in this embodiment, the boost pressure Pcmp is detected upon a lapse of the integration period Tsum.

Then, the first parameter GAave(A) and the first boost pressure Pcmp(A) in the first region A are calculated in steps S320-S340, and the second parameter GAave(B) and the second boost pressure Pcmp(B) in the second region B are calculated in steps S350-S370. Then, when all of the parameters needed for calculation of the value K used for malfunction diagnosis have been calculated (S380: YES), the value K is calculated in step S390. After the value K is calculated, it is determined in step S400 whether the value K is larger than the determination threshold value, to thus perform malfunction diagnosis.

Thus, how the boost pressure P changes according to change of the parameter having a positive correlation with the integrated intake air amount GAsum is determined based on the value K; therefore, variations in detection values due to the individual differences of the boost pressure sensor 16 can be reduced.

Subsequently, if the value K is larger than the determination threshold value (S400: YES), an informing operation is performed as the malfunction-time operation (S420). If, on the other hand, the value K is equal to or smaller than the determination threshold value (S400: NO), the normal-time operation is performed (S410).

As described above, the electronic control unit 39 functions as a calculating unit that calculates the integrated intake air amount GAsum by integrating the intake air amount GA over the integration period Tsum. The electronic control unit 39 also functions as a storage unit that stores the boost pressure Pcmp(A), boost pressure Pcmp(B) in the first region A and the second region B, and the first parameter GAave(A) and the second parameter GAave(B). In addition, the electronic control unit 39 functions as a diagnosing unit that calculates value K based on the calculated values stored in the storage unit, and determines that a malfunction occurs in the waste gate valve 35 when the value K is larger than the determination threshold value. Then, the electronic control unit 39 performs the operation of step S410 or step S420, to thus function as an informing unit that performs informing operation based on the result of malfunction diagnosis.

According to the embodiment as described above, the following effects are obtained. (1) In this embodiment, malfunction diagnosis is not performed using only a parameter obtained at a certain point in time, but performed using the average intake air amount GAave having a positive correlation with the integrated intake air amount GAsum that reflects the change history of the intake air amount GA during the integration period Tsum. Therefore, according to this embodiment, even if a turbo lag has not been eliminated, an influence of the turbo lag on the result of diagnosis is reduced or eliminated, and highly accurate malfunction diagnosis can be performed.

(2) It is determined that there is a closed-valve-sticking malfunction (i.e., the waste gate valve 35 is stuck in the closed state) when the value K corresponding to the slope of the thick solid line that connects the plotted points in FIG. 5 is larger than the value corresponding to the slope of the boundary between the distribution ranges indicated by the two-dot chain line, and that the waste gate valve 35 is in a normal state when the value K is smaller than the value correspond to the slope of the boundary.

When the waste gate valve 35 is stuck in the closed state, the boost pressure Pcmp should become higher as the intake air amount GA increases (with increases in the average intake air amount GAave and the integrated intake air amount GAsum). Accordingly, in the event of a closed-valve-sticking malfunction of the waste gate valve 35, the value K assumes a relatively large value. In this embodiment, this relationship is utilized, and it is determined that a malfunction occurs in the waste gate valve 35 when the value K is larger than the determination threshold value corresponding to the slope of the boundary shown in FIG. 5. The value corresponding to the slope of the boundary shown in FIG. 5 is used as the determination threshold value for malfunction diagnosis, because the value K in the event of closed-valve-sticking malfunction should be always larger than the value corresponding to the slope of the boundary.

Thus, in this embodiment, the value K is calculated based on the average intake air amounts GAave and the boost pressures Pcmp in the first region A and the second region B, and malfunction diagnosis is performed based on the value K. Namely, in this embodiment, malfunction diagnosis is performed not using the boost pressure Pcmp itself, but using the relationship between the boost pressures Pcmp detected under different conditions through the use of the same sensor. Namely, with this arrangement, it is possible to conduct malfunction diagnosis while reducing or eliminating an influence due to individual differences of sensors, without requiring adaptive operation for adaptation to sensor characteristics. In sum, according to this embodiment, variations in the results of diagnosis due to the individual differences of sensors can be reduced or eliminated. Also, the adaptive operation, such as adjustment of determination values in accordance with characteristics of respective sensors, etc., will not be needed.

(3) The supercharging system of this embodiment is configured such that malfunction diagnosis is carried out when the amount of change of the intake air amount GA per unit time is within a certain definite range. Thus, malfunction diagnosis can be performed with high accuracy, except in the case where a difference is less likely or unlikely to appear between the boost pressure P in the event of a closed-valve-sticking malfunction, and the boost pressure P during normal operation, and the case where the accuracy in malfunction diagnosis is reduced due to a large turbo lag.

(4) The system of this embodiment is configured such that malfunction diagnosis is carried out when the target boost pressure is equal to or lower than the predetermined pressure. Thus, since the malfunction diagnosis is conducted when the fully opening command is generated to the waste gate valve 35, it can be determined that a malfunction occurs in the waste gate valve 35 when the valve 35 is stuck in the closed state.

(5) The length of time required for malfunction diagnosis is increased as a period from the time when the integration period Tsum ends to the time when the boost pressure P used for diagnosis is obtained is longer. Also, as the period from the end of the integration period Tsum to the time when the boost pressure P used for diagnosis is obtained is longer, the energy Ei received by the turbine 31 until the boost pressure P is obtained has a greater influence on the boost pressure P. Therefore, as the period from the end of the integration period Tsum to the time when the boost pressure P is obtained is longer, the average intake air amount GAave that is directly proportional to the integrated intake air amount GAsum becomes less correlated with the boost pressure P that is actually obtained. Namely, as the period from the end of the integration period Tsum to the time when the boost pressure P used for diagnosis is obtained is longer, the accuracy in malfunction diagnosis is reduced. In this respect, malfunction diagnosis according to this embodiment is performed based on the boost pressure Pcmp obtained at the time when the integration period Tsum elapses; therefore, the malfunction diagnosis can be promptly performed with high accuracy.

(6) The system of this embodiment includes the informing unit that outputs a signal for informing the presence of a malfunction, based on the result of malfunction diagnosis. When it is determined that a malfunction occurs in the waste gate valve 35, the informing unit is configured to turn on a warning light so as to inform the occurrence of the malfunction. Thus, when it is determined that a malfunction occurs in the waste gate valve 35, it can be informed that the malfunction occurs in the waste gate valve 35.

The above-described embodiment may be modified as needed, and the invention may be practiced in the following forms. While the system of this embodiment is configured to execute malfunction diagnosis when a fully opening command is generated to the waste gate valve 35, the malfunction diagnosis may be conducted if the waste gate valve 35 is opened to such an extent that the malfunction diagnosis can be performed with high accuracy. Namely, the malfunction diagnosis can be conducted if the opening of the waste gate valve 35 is large enough to create a clear difference between the boost pressure P in the event of a closed-valve-sticking malfunction and the boost pressure P during normal operation. By suitably setting the predetermined pressure of the target boost pressure as a precondition, it is possible to set the degree by which the waste gate valve 35 is opened for execution of the malfunction diagnosis.

While the system of this embodiment is configured so that malfunction diagnosis is carried out, on the premise that both of the two conditions based on the amount of change of the intake air amount per unit time and the target boost pressure are satisfied, the invention is not limited to this arrangement. For example, the malfunction diagnosis may be carried out based on a signal, and a value of current, for driving the waste gate valve 35. Namely, parameters used for various preconditions and their numeral values may be changed in various ways, so that the malfunction diagnosis is carried out, under operating conditions that permit the malfunction diagnosis to be performed with high accuracy.

While the system of this embodiment is configured to turn on the warning light as a malfunction-time operation, this invention is not limited to this arrangement. For example, a malfunction of the waste gate valve may be indicated on a display of a navigation system, or the like. When it is determined that a malfunction occurs in the waste gate valve 35, an operation to remove a deposit that causes the valve to be stuck in the closed state may be performed, or various other examples may be employed, as malfunction-time operation performed in the event of a malfunction. Also, while the warning light is turned off as a normal-time operation, no operation like this normal-time operation may be performed when no malfunction is detected.

While the average intake air amount GAave is used as the parameter having a positive correlation with the integrated intake air amount GAsum in this embodiment, the invention is not limited to this arrangement. For example, the integrated intake air amount GAsum may be directly used, in place of the average intake air amount GAave, as a parameter having a positive correlation with the integrated intake air amount GAsum. In this case, it is preferable to determine characteristics of the determination threshold value, using a graph in which measurement results of the relationship between the integrated intake air amount GAsum and the boost pressure Pcmp during normal operation and the same relationship in the event of closed-valve-sticking malfunction are plotted, in place of the graph shown in FIG. 5.

While malfunction diagnosis is performed based on the boost pressure Pcmp measured at the time when the integration period Tsum elapses, this invention is not limited to this arrangement. For example, the system may be configured to detect the boost pressure P at a point in time during a period that starts upon a lapse of the integration period Tsum and ends when any of the preconditions ceases to be satisfied, and perform malfunction diagnosis based on the detected boost pressure P. However, in this case, since the influence of the energy Ei received by the turbine 31 increases after the lapse of the integration period Tsum, it is preferable to conduct the malfunction diagnosis, using the boost pressure P detected at a point in time that is as close as possible to the time point of the lapse of the integration period Tsum, so as to achieve highly accurate malfunction diagnosis.

The informing unit is not necessarily provided. For example, information indicating that a malfunction occurs in the waste gate valve 35 may be stored in a memory, as a result of malfunction diagnosis.

The system may determine not only whether a malfunction occurs in the waste gate valve 35, but also whether the valve 35 is stuck in the closed state, as one type of malfunctions. For example, it may be informed that the waste gate valve 35 is stuck in the closed state, or information indicating the closed-valve-sticking malfunction may be stored in a memory.

In the above-described embodiment, it is determined, from the target boost pressure, whether the fully opening command is generated to the waste gate valve 35. However, this invention is not limited to this arrangement, but it may be determined, based on a signal or a value of current for driving the waste gate valve 35, for example, whether the fully opening command is generated to the waste gate valve 35.

In the above-described embodiment, the first region A is set as a region in which the intake air amount GA is small, and the second region B is set as a region in which the intake air amount GA is large. To the contrary, the first region A may be set as a region in which the intake air amount GA is large, and the second region B may be set as a region in which the intake air amount GA is small. In this case, too, since the value of K is the same, the same or similar diagnostic result can be obtained. In setting of the first and second regions, if the two regions are set to be close to each other, an influence of variations of the boost pressure Pcmp on the value K calculated is increased. Therefore, it is preferable to set the two regions to be spaced apart from each other. However, a valve opening command is likely to be generated to the waste gate valve 35 when the intake air amount GA is large; therefore, if the two regions are spaced too apart from each other, the precondition ceases to be satisfied in the region where the intake air amount GA is large, and the frequency of execution of malfunction diagnosis is reduced. Accordingly, in setting of the first and second regions, it is preferable to set the two regions as apart as possible from each other, within the range in which a sufficiently high frequency of execution of malfunction diagnosis can be ensured.

What is claimed is:

1. A supercharging system for an internal combustion engine including an exhaust passage, the supercharging system comprising:
    a supercharger including a turbine provided in the exhaust passage;
    a bypass passage located in the exhaust passage so as to bypass the turbine;
    a waste gate valve configured to interrupt flow of exhaust gas into the bypass passage when the waste gate valve is closed;
    a first sensor configured to detect an intake air amount of the internal combustion engine;
    a second sensor configured to detect a boost pressure; and
    an electronic control unit configured to:
    conduct a malfunction diagnosis of the waste gate valve when a precondition is satisfied, the precondition including a condition that a valve opening command is generated, by the electronic control unit, to the waste gate valve;
    calculate a first value of a parameter having a positive correlation with an integrated intake air amount over a first predetermined integration period when the precondition is satisfied a first time;
    detect a first value of a boost pressure based upon an output signal of the second sensor at a point in time during a period from when the first predetermined integration period elapses until when the precondition satisfied the first time ceases to be satisfied;
    store the first value of the parameter as a first parameter and store the first value of the boost pressure as a first boost pressure in a memory when the intake air amount is within a first region as determined based upon an output signal of the first sensor;
    calculate a second value of the parameter having the positive correlation with the integrated intake air amount over a second predetermined integration period when the precondition is satisfied a second time;
    detect a second value of the boost pressure based upon the output signal of the second sensor at a point in time during a period from when the second predetermined integration period elapses until when the precondition satisfied the second time ceases to be satisfied;
    store the second value of the parameter as a second parameter and store the second value of the boost pressure as a second boost pressure in the memory when the intake air amount is within a second region as determined based upon the output signal of the first sensor, the second region being spaced apart from the first region;
    obtain a first difference by subtracting the first boost pressure from the second boost pressure;
    obtain a second difference by subtracting the first parameter from the second parameter;
    obtain a quotient by dividing the first difference by the second difference; and
    determine that a malfunction occurs in the waste gate valve when the quotient is larger than a determination threshold value.

2. The supercharging system according to claim 1, wherein the electronic control unit is configured to
    calculate an average intake air amount in the first predetermined integration period as the first value of the parameter, and
    calculate an average intake air amount in the second predetermined integration period as the second value of the parameter.

3. The supercharging system according to claim 1, wherein the precondition further includes a condition that an amount of change of the intake air amount per unit time is within a predetermined range.

4. The supercharging system according to claim 1, wherein the precondition includes a condition that a target boost pressure is equal to or lower than a predetermined pressure.

5. The supercharging system according to claim 1, wherein the electronic control unit is configured to
    store the detected first value of the boost pressure when the first predetermined integration period elapses, and
    store the detected second value of the boost pressure when the second predetermined integration period elapses.

6. The supercharging system according to claim 1, wherein the electronic control unit is configured to output a signal so as to inform that the malfunction occurs in the waste gate valve when the electronic control unit determines that the malfunction occurs in the waste gate valve.

7. The supercharging system according to claim 1, further comprising:
    a warning light configured to inform that the malfunction occurs in the waste gate valve when the electronic control unit determines that the malfunction occurs in the waste gate valve.

8. A control method for a vehicle including
    an internal combustion engine including an exhaust passage, and
    a supercharging system including
    a supercharger including a turbine provided in the exhaust passage,
    a bypass passage located in the exhaust passage so as to bypass the turbine,
    a waste gate valve configured to interrupt flow of exhaust gas into the bypass passage when the waste gate valve is closed,
    a first sensor configured to detect an intake air amount of the internal combustion engine,
    a second sensor configured to detect a boost pressure, and
    an electronic control unit,
    the control method comprising:
    conducting a malfunction diagnosis of the waste gate valve, by the electronic control unit, when a precondition is satisfied, the precondition including a condition that a valve opening command is generated, by the electronic control unit, to the waste gate valve;
    calculating a first value of a parameter having a positive correlation with an integrated intake air amount over a first predetermined integration period, by the electronic control unit, when the precondition is satisfied a first time;
    detecting, by the electronic control unit, a first value of a boost pressure based upon an output signal of the second sensor at a point in time during a period from when the first predetermined integration period elapses until when the precondition satisfied the first time ceases to be satisfied;
    storing, by the electronic control unit, the first value of the parameter as a first parameter and storing, by the electronic control unit, the first value of the boost pressure as a first boost pressure in a memory when the intake air amount is within a first region as determined based upon an output signal of the first sensor;

calculating, by the electronic control unit, a second value of the parameter having the positive correlation with the integrated intake air amount over a second predetermined integration period when the precondition is satisfied a second time;

detecting, by the electronic control unit, a second value of the boost pressure based upon the output signal of the second sensor at a point in time during a period from when the second predetermined integration period elapses until when the precondition satisfied the second time ceases to be satisfied;

storing, by the electronic control unit, the second value of the parameter as a second parameter and storing, by the electronic control unit, the second value of the boost pressure as a second boost pressure in the memory when the intake air amount is within a second region as determined based upon the output signal of the first sensor, the second region being spaced apart from the first region;

obtaining, by the electronic control unit, a first difference by subtracting the first boost pressure from the second boost pressure;

obtaining, by the electronic control unit, a second difference by subtracting the first parameter from the second parameter;

obtaining, by the electronic control unit, a quotient by dividing the first difference by the second difference; and determining that a malfunction occurs in the waste gate valve, by the electronic control unit, when the quotient is larger than a determination threshold value.

9. The control method according to claim 8, wherein the vehicle includes a warning light, and the control method further comprises turning on the warning light, by the electronic control unit, when the electronic control unit determines that the malfunction occurs in the waste gate valve.

10. The control method according to claim 8, wherein the precondition further includes a condition that an amount of change of the intake air amount per unit time is within a predetermined range.

11. The control method according to claim 8, wherein the precondition includes a condition that a target boost pressure is equal to or lower than a predetermined pressure.

* * * * *